US010921138B2

(12) United States Patent
Kusano et al.

(10) Patent No.: US 10,921,138 B2
(45) Date of Patent: *Feb. 16, 2021

(54) AUTONOMOUS VEHICLE VIRTUAL REALITY NAVIGATION SYSTEM

(71) Applicant: TOYOTA MOTOR ENGINEERING & MANUFACTURING NORTH AMERICA, INC., Plano, TX (US)

(72) Inventors: Kristofer D. Kusano, Ann Arbor, MI (US); Yi Li, Ann Arbor, MI (US); Hideki Hada, Ann Arbor, MI (US); Miles J. Johnson, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 262 days.

This patent is subject to a terminal disclaimer.

(21) Appl. No.: 15/981,418

(22) Filed: May 16, 2018

(65) Prior Publication Data
US 2018/0259349 A1 Sep. 13, 2018

Related U.S. Application Data

(63) Continuation of application No. 15/077,225, filed on Mar. 22, 2016, now Pat. No. 10,048,080.

(51) Int. Cl.
*G01C 21/34* (2006.01)
*G01C 21/36* (2006.01)
*B60W 50/14* (2020.01)

(52) U.S. Cl.
CPC ......... *G01C 21/3415* (2013.01); *B60W 50/14* (2013.01); *G01C 21/365* (2013.01); *G01C 21/3667* (2013.01)

(58) Field of Classification Search
CPC .............. G01C 21/3415; G01C 21/365; G01C 21/3667; B60W 50/14
(Continued)

(56) References Cited

U.S. PATENT DOCUMENTS 5,051,735 A 9/1991 Furukawa
8,089,375 B1 1/2012 Seah
(Continued)

FOREIGN PATENT DOCUMENTS

DE 102007017174 A1 10/2008
DE 102009019610 A1 * 11/2010 ......... G01C 21/3415
(Continued)

OTHER PUBLICATIONS

Burak Kantarci, "Cyber-Physical Alternate Route Recommendation System for Paramedics in an Urban Area," 2015, Publisher: IEEE.*
(Continued)

*Primary Examiner* — Tuan C To
(74) *Attorney, Agent, or Firm* — Oblon, McClelland, Maier & Neustadt, L.L.P.

(57) ABSTRACT

The virtual reality navigation system can display the position of an autonomous vehicle at a predetermined amount of time in the future via virtual reality. A virtual reality display can display a virtual reality autonomous vehicle, as if the virtual reality autonomous vehicle is the autonomous vehicle operating at the predetermined amount of time in the future. Additionally, a virtual reality interface can provide an interface for an operator to interact with the environment of the autonomous vehicle. The virtual reality interface can receive an alternate route selection, and display in virtual reality the one or more maneuvers that would be required to reach the selection.

20 Claims, 8 Drawing Sheets

(58) Field of Classification Search
USPC .......................................................... 701/26
See application file for complete search history.

(56) References Cited

U.S. PATENT DOCUMENTS

| | | | |
|---|---|---|---|
| 8,346,426 B1 | 1/2013 | Szybalski et al. | |
| 8,521,411 B2* | 8/2013 | Grabowski | G01C 21/365 |
| | | | 701/532 |
| 8,676,431 B1 | 3/2014 | Mariet et al. | |
| 8,738,213 B1 | 5/2014 | Szybalski et al. | |
| 8,924,150 B2 | 12/2014 | Tsimhoni et al. | |
| 8,970,453 B2 | 3/2015 | Sasaki et al. | |
| 9,008,904 B2* | 4/2015 | Szczerba | G06F 3/0412 |
| | | | 701/36 |
| 9,041,741 B2 | 5/2015 | Mabbutt et al. | |
| 9,134,729 B1 | 9/2015 | Szybalski et al. | |
| 9,207,679 B1* | 12/2015 | Chatham | G08G 1/167 |
| 9,618,346 B2 | 4/2017 | Wenneman | |
| 9,779,627 B1* | 10/2017 | Nepogodin | G08G 1/202 |
| 2003/0060965 A1 | 3/2003 | MacPhail | |
| 2007/0244639 A1 | 10/2007 | Butterworth et al. | |
| 2010/0253595 A1 | 10/2010 | Szczerba | |
| 2012/0078509 A1* | 3/2012 | Choi | G01C 21/3415 |
| | | | 701/423 |
| 2013/0006464 A1* | 1/2013 | Speiser | G08G 1/096844 |
| | | | 701/25 |
| 2013/0179023 A1 | 7/2013 | Schmidt | |
| 2013/0321398 A1 | 12/2013 | Howard | |
| 2013/0325321 A1* | 12/2013 | Pylappan | G01C 21/20 |
| | | | 701/420 |
| 2014/0200805 A1 | 7/2014 | Modica | |
| 2014/0222277 A1 | 8/2014 | Tsimhoni et al. | |
| 2014/0236483 A1 | 8/2014 | Beaurepaire et al. | |
| 2014/0309927 A1* | 10/2014 | Ricci | G06Q 30/0645 |
| | | | 701/424 |
| 2014/0362195 A1 | 12/2014 | Ng-Thow-Hing et al. | |
| 2014/0379258 A1* | 12/2014 | Beaurepaire | G01C 21/34 |
| | | | 701/533 |
| 2015/0100179 A1* | 4/2015 | Alaniz | A63F 13/00 |
| | | | 701/1 |
| 2015/0149088 A1 | 5/2015 | Attard et al. | |
| 2015/0312863 A1* | 10/2015 | Shen | G01C 21/3697 |
| | | | 455/574 |
| 2016/0069694 A1* | 3/2016 | Tao | G01C 21/343 |
| | | | 701/410 |
| 2016/0169692 A1* | 6/2016 | Gupta | G01C 21/3469 |
| | | | 701/521 |
| 2016/0223348 A1* | 8/2016 | Witte | G01C 21/3492 |
| 2016/0247106 A1* | 8/2016 | Dalloro | G06Q 10/06313 |
| 2016/0274239 A1* | 9/2016 | Gupta | G01S 17/06 |
| 2016/0323715 A1 | 11/2016 | Leroux | |
| 2016/0334230 A1* | 11/2016 | Ross | G05D 1/0061 |
| 2016/0357185 A1 | 12/2016 | Laur | |
| 2017/0103571 A1* | 4/2017 | Beaurepaire | G01C 21/3667 |
| 2017/0115126 A1* | 4/2017 | McMaster | G01C 21/3492 |
| 2017/0120803 A1* | 5/2017 | Kentley | B60Q 1/525 |
| 2017/0122764 A1* | 5/2017 | Nakahara | G01C 21/3682 |
| 2017/0146350 A1* | 5/2017 | Beaurepaire | H04W 12/08 |
| 2017/0161949 A1 | 6/2017 | Seder | |
| 2017/0184411 A1* | 6/2017 | Glasgow | G01C 21/3415 |
| 2017/0268895 A1* | 9/2017 | Myers | B60W 40/072 |
| 2019/0293437 A1* | 9/2019 | Szubbocsev | G01C 21/3415 |

FOREIGN PATENT DOCUMENTS

| | | | |
|---|---|---|---|
| DE | 102011084560 A1 | | 4/2013 |
| JP | 09042984 A | * | 2/1997 |
| JP | 2015033890 A | * | 2/2015 |
| WO | 9826253 A1 | | 6/1998 |
| WO | WO-0003906 A1 | * | 1/2000 ............. B61L 29/18 |

OTHER PUBLICATIONS

Raziq et al., "Smartphone-Based Accurate Range and Energy Efficient Route Selection for Electric Vehicle," 2012, Publisher: IEEE.*
Pravin et al., "Optimized Local Route Repair and Congestion Control in Mobile Ad Hoc Network," 2015, Publisher: IEEE.*

* cited by examiner

AUTONOMOUS VEHICLE VIRTUAL REALITY NAVIGATION SYSTEM

CROSS-REFERENCE TO RELATED APPLICATIONS

This application is a continuation of U.S. application Ser. No. 15/007,225, filed Mar. 22, 2016, the entire contents of which are incorporated herein by reference.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Navigation systems found in many vehicles have developed to include displaying the vehicle's current position to give the operator an estimate of where the vehicle is in relation the route they are on. Navigation systems can assist the driver in route guidance so the operator can focus on operating the vehicle. With the introduction of autonomous vehicles, navigation systems are not only utilized to display information to the operator, but many of the features of navigation systems, such as the current position of the vehicle, can also provide information responsible for allowing autonomous vehicles to navigate their environment autonomously.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Embodiments of the disclosed subject matter relate generally to systems, apparatuses, and methods for an autonomous vehicle virtual reality navigation system. The system can display the autonomous vehicle operating at a predetermined amount of time in the future. Displaying the autonomous vehicle can be in a virtual reality, via a virtual reality display, such that the virtual reality is immersive multimedia or a computer simulated reality, for example. In other words, an operator (i.e., driver/passenger) in the autonomous vehicle can view what the autonomous vehicle is planning to do at a predetermined amount of time in the future (e.g., continue driving forward, change lanes, make a turn, decelerate, etc.). Additionally, the virtual reality is displayed continuously as if the operator is viewing a video or virtual representation of the autonomous vehicle executing vehicle maneuvers at the predetermined amount of time in the future.

The system can include a virtual reality interface. Upon selection of a desired location (on the road, for example), the operator can view the autonomous vehicle executing one or more vehicle maneuvers to reach the selected location in virtual reality. The one or more vehicle maneuvers can be the predicted path of the autonomous vehicle. The one or more vehicle maneuvers can be predicted to require a predetermined amount of time to execute. The execution time being the same amount of time as the predetermined amount of time in the future the operator views on the virtual reality display. For example, if the operator is viewing the autonomous vehicle at 10 seconds in the future on the virtual reality display, the operator can select a different location on the road, via the virtual reality interface, indicating that the operator wants to adjust the predicted path of the autonomous vehicle. The virtual reality display and/or interface can display the one or more maneuvers that the autonomous vehicle plans to execute to reach the selected position. Because the autonomous vehicle was previously displayed 10 seconds in the future, the updated position of the vehicle will be different based on the alternate route selected by the operator. Therefore, the vehicle maneuvers can be displayed up until the autonomous vehicle reaches a position corresponding to the newly selected position, then continue on the new path after reaching the selected position at the predetermined amount of time in the future.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
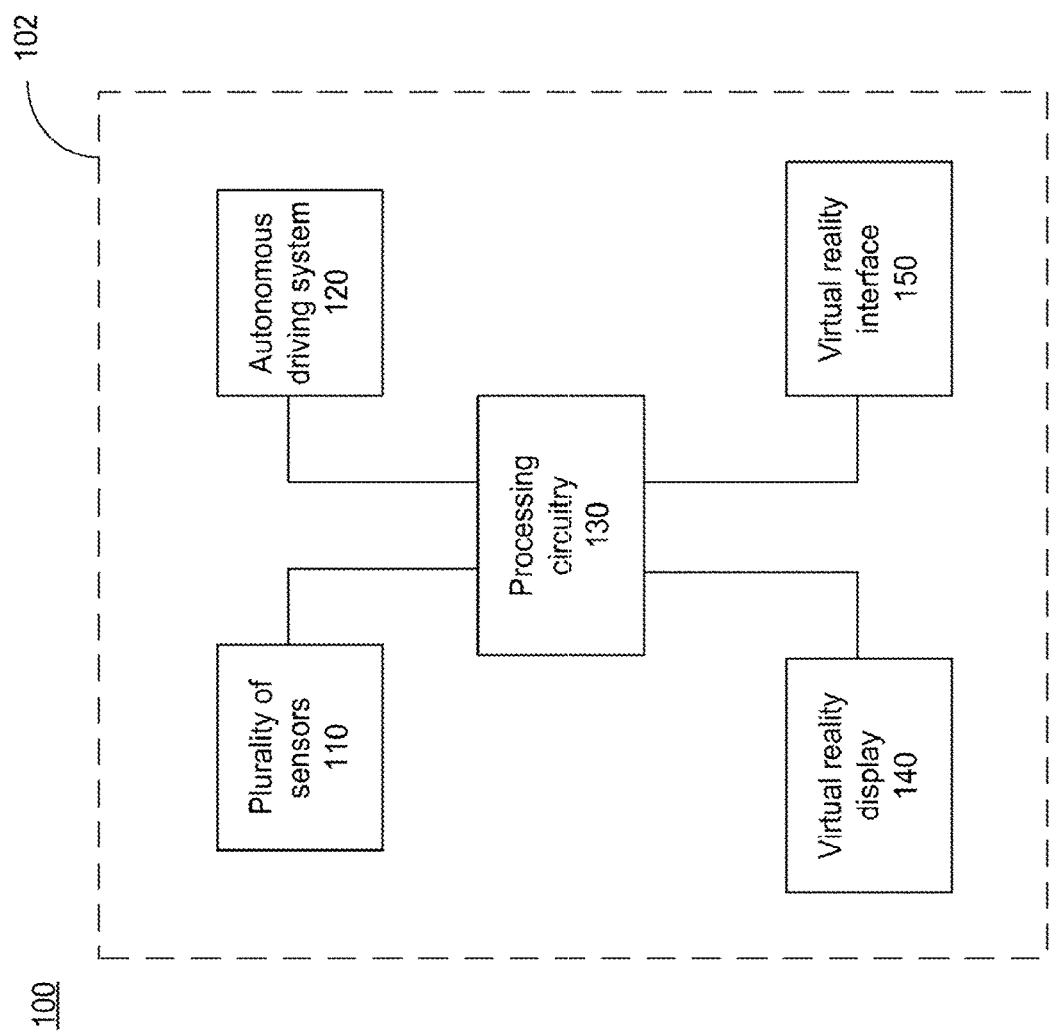
FIG. 1 depicts a block diagram of the virtual reality navigation system according to one or more embodiments of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, terms such as "first," "second," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views.

FIG. 1 is a block diagram of a virtual reality navigation system 100 (herein referred to as the system 100) according to one or more embodiments of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

System 100 can comprise a plurality of sensors 110, an autonomous driving system 120, a processor or processing circuitry 130 (which can include internal and/or external memory), a virtual reality display 140, and a virtual reality interface 150. In one or more embodiments, the plurality of sensors 110, autonomous driving system 120, the processing circuitry 130, the virtual reality display 140, and the virtual reality interface 150 can be implemented in apparatus 102, such as a vehicle, for instance, wherein the vehicle can be an autonomous vehicle. Further, the aforementioned components can be electrically connected or in electrical or electronic communication with each other as diagrammatically represented by FIG. 1, for example.

Generally speaking, system 100 can cause or allow an autonomous vehicle to be displayed a predetermined amount of time in the future in virtual reality.

More specifically, the autonomous vehicle can be viewed by the operator on one or more of the virtual reality display and virtual reality interface, such that the autonomous vehicle can be viewed as if the autonomous vehicle was driving at a predetermined amount of time in the future. The operator can select a position in the autonomous vehicle's environment via the virtual reality interface. The system 100 can then display, in virtual reality, the one or more vehicle maneuvers required to reach the selected position before continuing to show the autonomous vehicle driving along the selected route at the predetermined amount of time in the future.

The plurality of sensors 110 can include various sensors to operate an autonomous vehicle as further described herein. They types of sensors 110 can include a LIDAR sensor, a Radar sensor, a laser scanner, at least one camera, an odometer, a GPS antenna, Sonar, and the like. The output from the plurality of sensors 110 can be utilized to safely operate an autonomous vehicle as would be known by one of ordinary skill in the art. Additionally, the output from the plurality of sensors 110 can be utilized to determine the position of the vehicle at the predetermined amount of time in the future. For example, the output from the plurality of sensors 100 can determine that an upcoming curve in the road requires the autonomous vehicle to slow down to safely execute the turn. Therefore, the system can display the autonomous vehicle slowing down in anticipation for the turn and then entering the turn in virtual reality even before the autonomous vehicle begins decelerating.

It should be appreciated that any sensor can be included in the plurality of sensors 110 such that the sensor may improve the safety and/or the precision with which an autonomous vehicle operates as would be known by one or ordinary skill in the art. Similarly, the output received from the additional sensors could be utilized in the system 100.

The autonomous driving system 120 can include various mechanisms to mechanically operate an autonomous vehicle. For example, the mechanisms can include a motor in each wheel to rotate the wheel, an actuator to automatically operate the steering wheel, one or more mechanisms to cause the vehicle to accelerate via a gas pedal disposed in the vehicle, decelerate via a braking mechanism disposed in the vehicle, and the like, as well as any mechanisms that are required to operate a vehicle in general whether or not they are specifically operated autonomously by the autonomous vehicle. Therefore the autonomous vehicle system 120 can operate the autonomous vehicle mechanically and in response to signals received from the processing circuitry 130 as would be known by one or ordinary skill in the art.

The processor or processing circuitry 130 can carry out instructions to perform or cause performance of various functions, operations, steps or processes of the system 100. The processor/processing circuitry 130 can be configured to store information in memory, operate the system 100, control the autonomous driving system 120, display the autonomous vehicle a predetermined amount of time in the future via the virtual reality display 140, and display and receive signals from the virtual reality interface 150.

The virtual reality display 140 can be a Heads Up Display (HUD), a hologram projection system, a liquid crystal display (LCD), and the like. The virtual reality display 140 can display the autonomous vehicle at the predetermined amount of time in the future in virtual reality. The virtual reality display can also display objects in the autonomous vehicle's environment including other vehicles, roads, buildings, pedestrians, etc. as identified by the plurality of sensors 110 (LIDAR sensor, camera, etc.), maps, databases of images, and the like.

The virtual reality interface 150 can display various information to the operator including the position of the autonomous vehicle at the predetermined amount of time in the future (i.e., mirroring the environment displayed via the virtual reality display 140), a confirmation button, a section to adjust the predetermined amount of time, and the like as further described herein.

Figure 2:
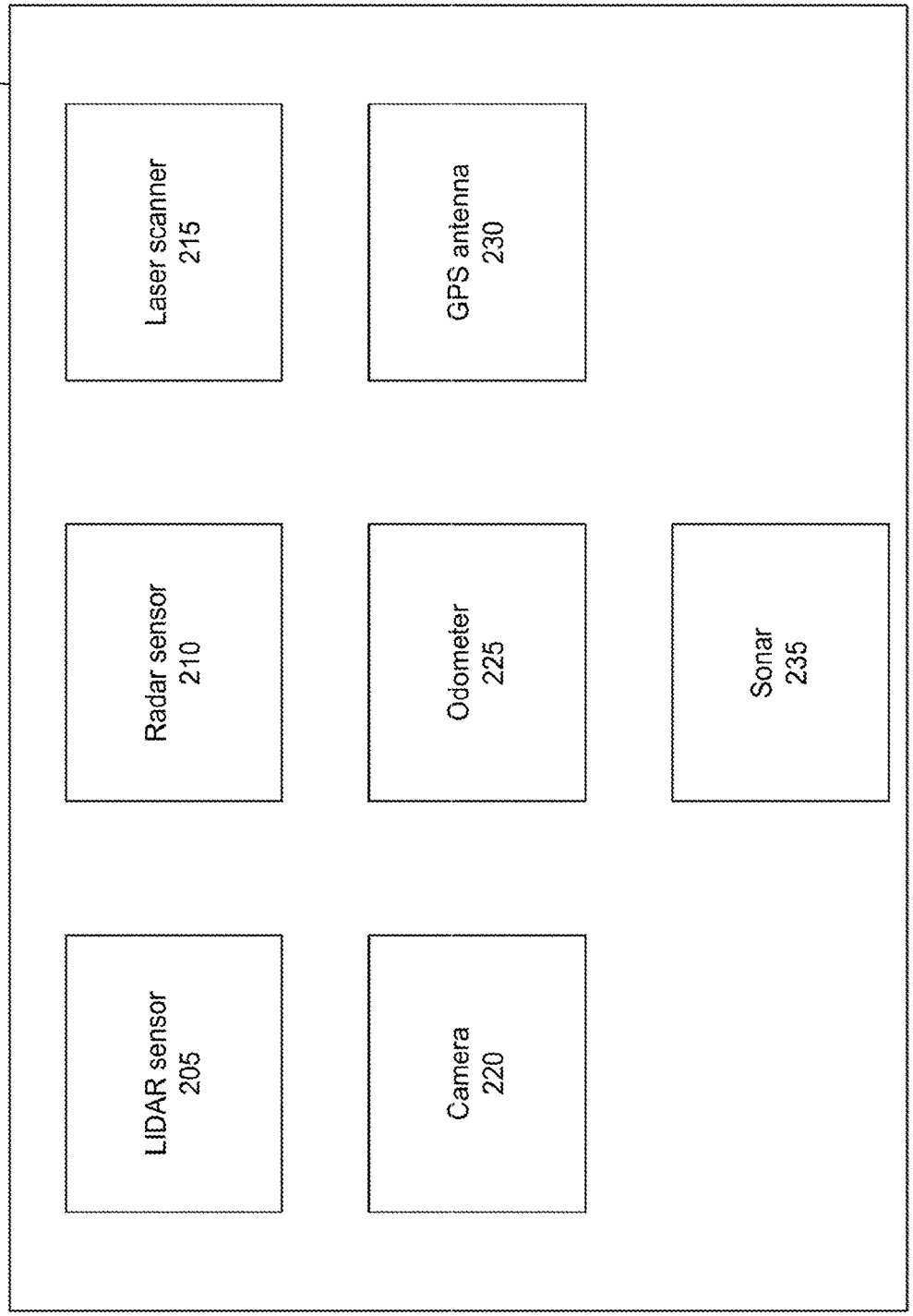
FIG. 2 depicts a block diagram of a plurality of sensors in the virtual reality navigation system according to one or more embodiments of the disclosed subject matter.

FIG. 2 is a block diagram of the plurality of sensors 110. The plurality of sensors 110 can include a LIDAR sensor 205, a radar sensor 210, a laser scanner 215, a camera 220, an odometer 225, a GPS antenna 230, and Sonar 235. The plurality of sensors 110 can assist in autonomous operation of an autonomous vehicle as would be known by a person of ordinary skill in the art. It should be appreciated that one or more of each the plurality of sensors 110 as described herein can be disposed within or on the autonomous vehicle. Additionally, the sensors described herein are not intended to be limiting as more and different sensors may further improve the operation of the autonomous vehicle.

Figure 3:
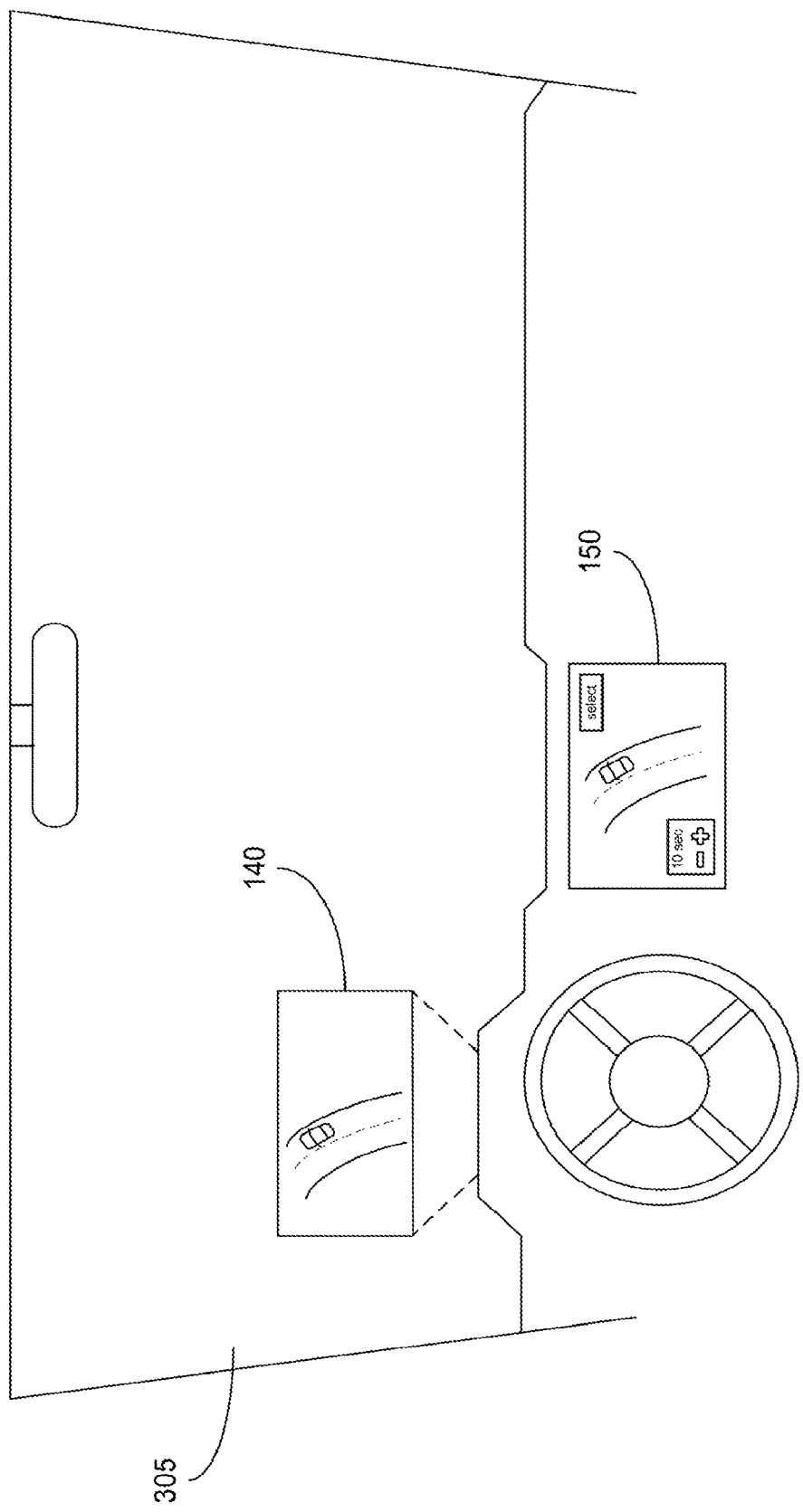
FIG. 3 depicts an exemplary operator's view of the virtual reality navigation system according to one or more embodiments of the disclosed subject matter.

FIG. 3 depicts an exemplary operator view of the system 100 according to one or more embodiments of the disclosed subject matter. The virtual reality display 140 can be projected on a windscreen 305 of the autonomous vehicle via a HUD, for example. Although the virtual reality display could be a hologram projection system or an LCD screen. The virtual reality interface 150 can be integrated into a dashboard, console, instrument cluster, and the like of the autonomous vehicle.

Figure 4A:
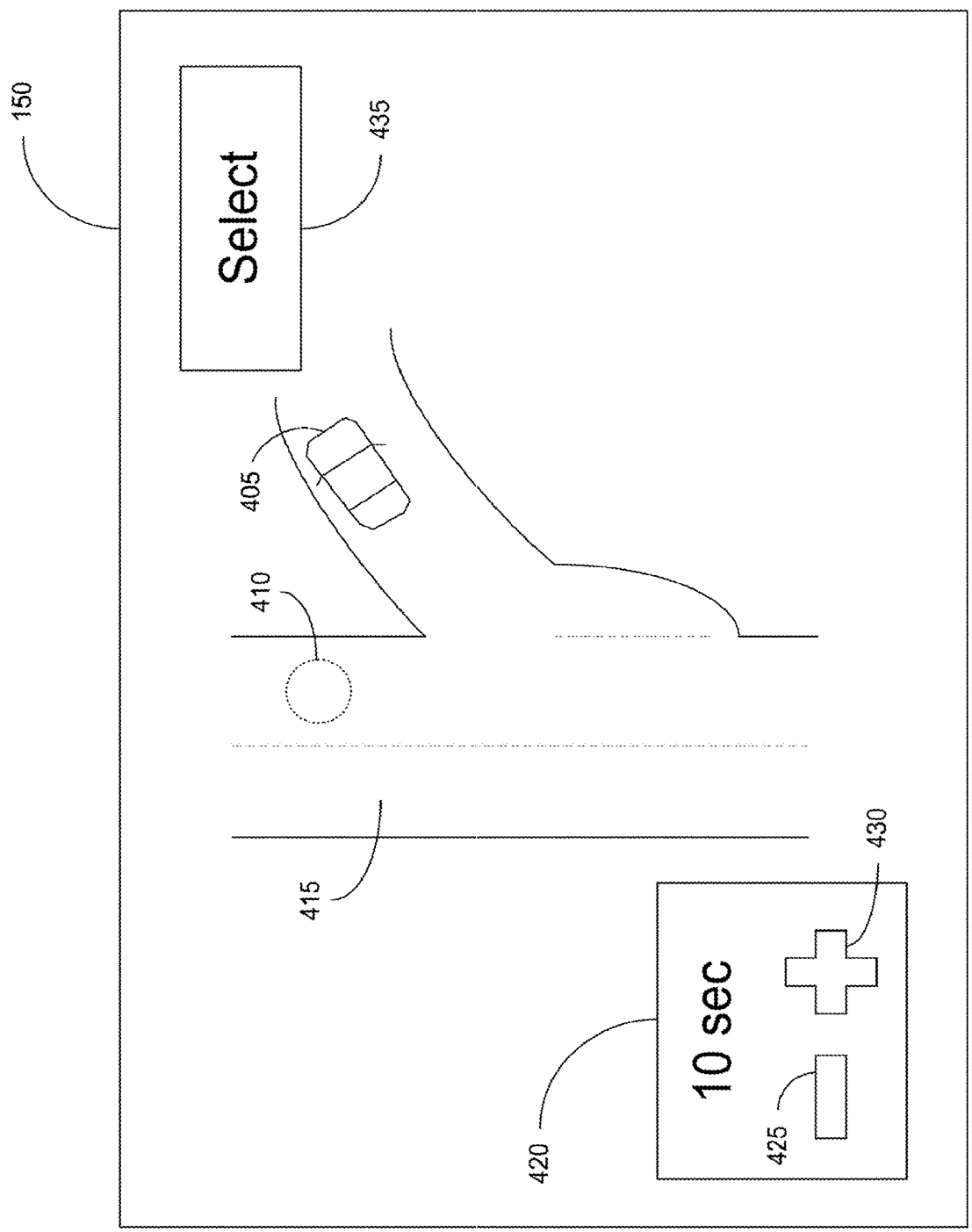
FIG. 4A depicts a virtual reality interface according to one or more embodiments of the disclosed subject matter.

FIG. 4A depicts the virtual reality interface 150 according to one or more embodiments of the disclosed subject matter. The virtual reality interface 150 can be a touch enabled display as would be known by one of ordinary skill in the art. The virtual reality display 150 can display the autonomous vehicle a predetermined amount of time in the future and the autonomous vehicle's environment, thereby mimicking the view of the virtual reality display 140. However, in addition to being touch enabled to allow interaction, the virtual reality interface 150 can include a confirmation button 435 and a virtual reality adjustment section 420. The confirmation button 435 can be utilized to confirm various interactions between the operator and the virtual reality interface 150. The virtual reality adjustment section 420 can display the amount of time in the future that the autonomous vehicle is displayed and can include an increase button 430 and a decrease button 425. For example, as illustrated in FIG. 4A, the virtual reality adjustment section 420 displays 10 seconds, which can indicate that a virtual reality autonomous vehicle 405 driving on a road 415 is being displayed at 10 seconds in the future. Additionally, interaction 410 is indicative of a touch interaction, for example. In other words, the interaction 410 can be a location on the road 415 that the operator physically touched on the virtual reality interface 150. The interaction 410 can indicate that the operator would like to adjust the route of the virtual reality autonomous vehicle 405. In other words, at 10 seconds in the future, the virtual reality autonomous vehicle 405 will be taking an exit off of the main section of the road 415. However, based on the interaction 410, the operator would like to prevent the autonomous vehicle from taking the exit off of the main section of the road 415, and has indicated this by interaction 410, effectively telling the system that the autonomous vehicle should continue forward to the position indicated by the interaction 410.

Figure 4B:
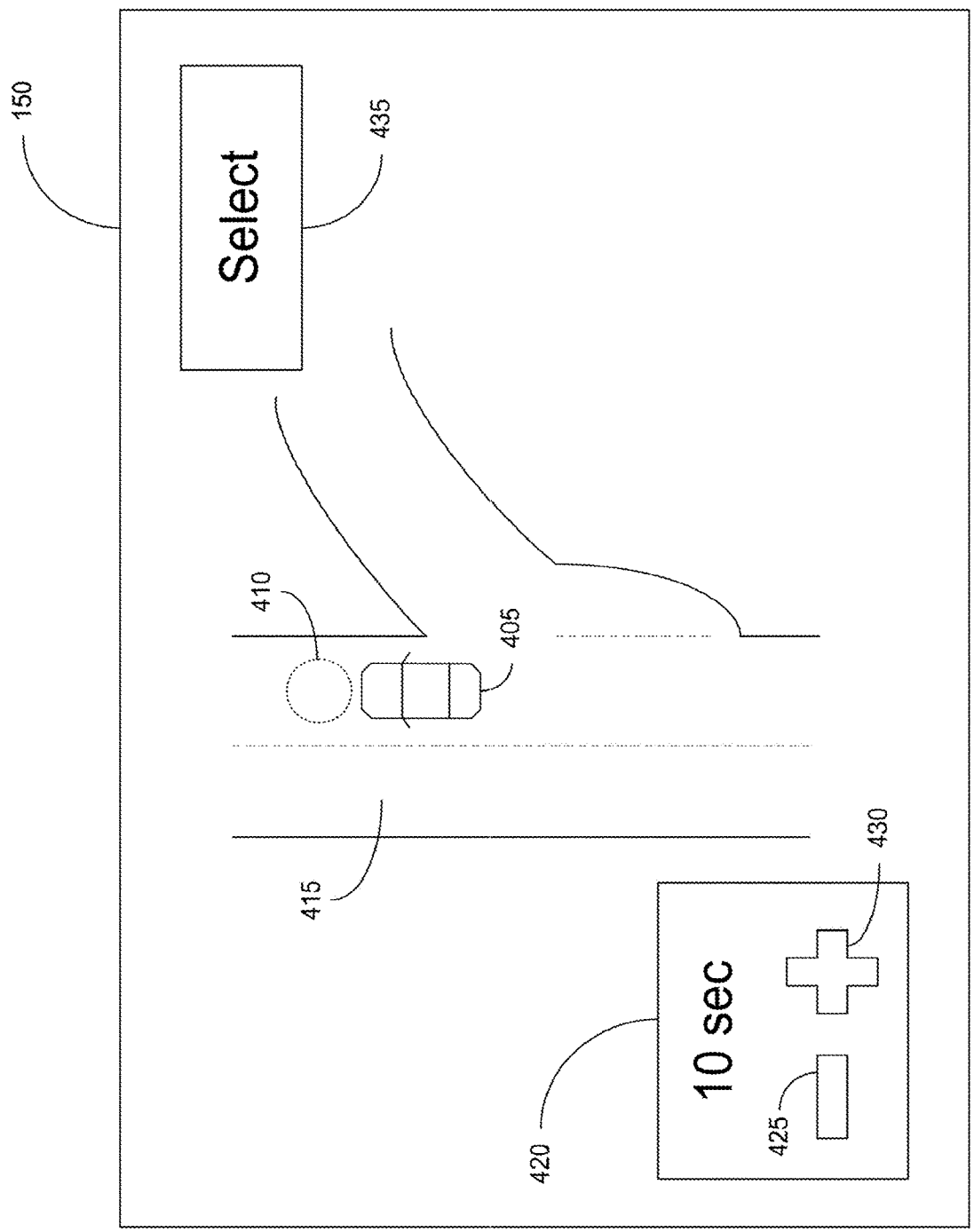
FIG. 4B depicts a virtual reality interface after a selection to alter the route of the autonomous vehicle according to one or more embodiments of the disclosed subject matter.

FIG. 4B depicts the virtual reality autonomous vehicle 410 responding to the interaction 410. After the interaction 410, the system 100 can determine an alternate route to reach the position indicated by the interaction 410. For example, as illustrated in FIG. 4B, the virtual reality autonomous vehicle 405 is no longer taking the exit off of the main section of the road 415. There may be a plurality of possible routes to reach the position indicated by the interaction 410. For example, the route will be safe, such that an interaction 410 that would cause an accident or place the autonomous vehicle in an unsafe situation may be prevented. Additionally, should a position indicated by the interaction 410 be unsafe or unavailable, the system 100 may automatically suggest a closest alternate route that is most similar to the interaction 410 while being a possible position to reach. For example, the operator may have accidentally touched the screen in a position placing the interaction 410 half on the road 415 and half off the road 415. Therefore, the system 100 may determine that the closest available route that is most similar to the interaction 410 is the same position but placing the autonomous vehicle fully on the road 415. The automatically suggested alternate route can be confirmed via the operator's interaction with the confirmation button 435. Confirmation could also be performed via voice commands, for example.

Figure 5:
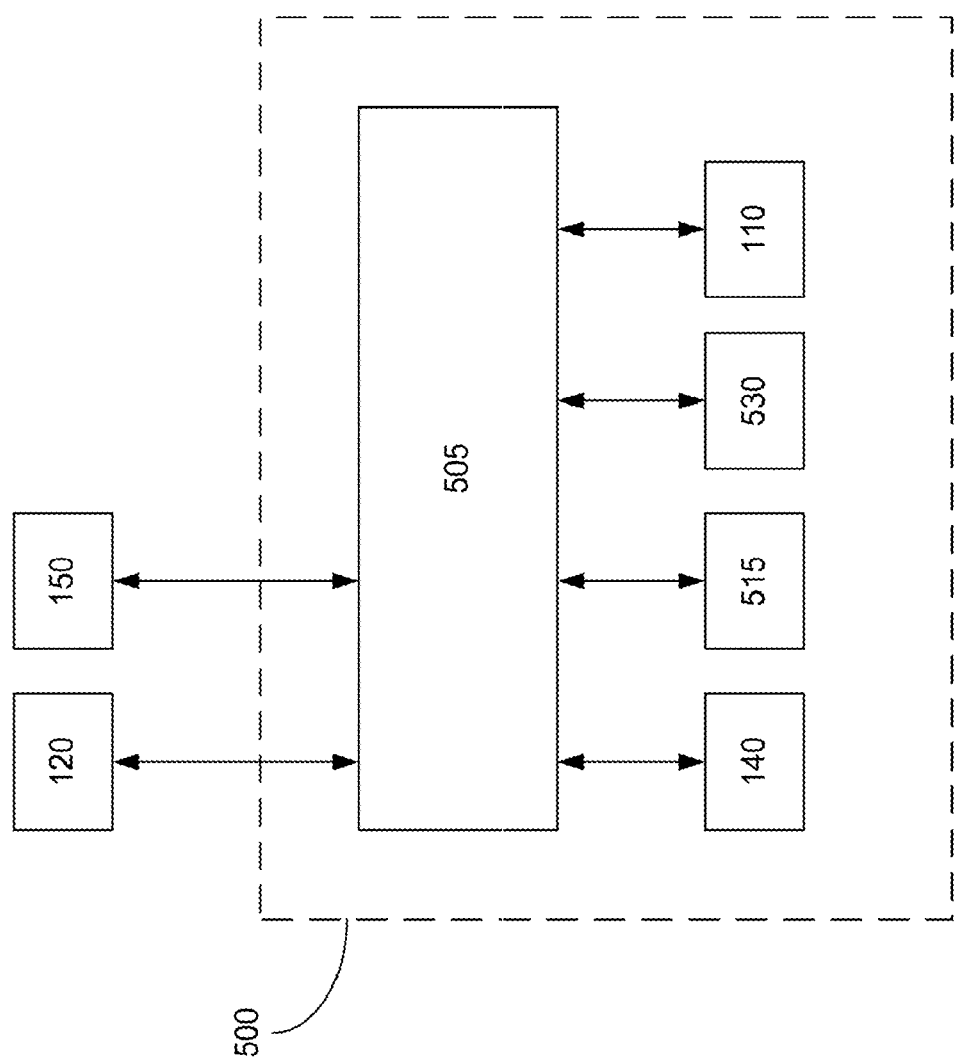
FIG. 5 depicts an exemplary control system of the virtual reality navigation system according to one or more embodiments of the disclosed subject matter.

In FIG. 5, the system 500 can include a control circuit 505, the plurality of sensors 110, the autonomous driving system 120, the virtual reality display 140, the virtual reality interface 150, a positioning system 515, and a wireless receiver/transmitter 530.

The control circuit 505, which may be representative of processor/processing circuitry 130, can be configured to perform or cause performance of multiple functions, including receiving, monitoring, recording, storing, indexing, processing, and/or communicating data. The control circuit 505 can be integrated as one or more components, including memory, a central processing unit (CPU), Input/Output (I/O) devices or any other components that may be used to run an application. The control circuit 505 can be programmed to execute a set of predetermined instructions. Various instructions including lookup tables, maps, and mathematical equations can be stored in memory, however, it should be appreciated that the storing or reading of such information can be accomplished with alternative types of computer-readable media including hard disks, floppy disks, optical media, CD-ROM, or other forms of RAM or ROM. Additionally, other circuitry including power supply circuitry, signal-conditioning circuitry, solenoid driver circuitry, and communication circuitry can be included in the control circuit 505. Further, it should be appreciated that the control circuit 505 can include multiple controllers wherein each controller is dedicated to perform one or more of the above mentioned functions.

The control circuit 505 can be communicably coupled to the plurality of sensors 110. Each of the sensors 110 can provide output signals indicative of parameters related to the environment of the stand-alone apparatus 102, such as the vehicle with autonomous driving capability as described herein, via the system 100. The plurality of sensors 110 can be located in various positions on the stand-alone apparatus 102 such that the sensors are able to allow the vehicle to operate autonomously and determine the position of the autonomous vehicle at the predetermined amount of time in the future. The control circuit 505 can receive signals from each of sensors 110.

Optionally, the control system 500 can include a positioning system 515 configured to determine the location of the system 100. In an embodiment, the positioning system 515 can be a satellite positioning system such as GPS. Alternatively, the positioning system 515 can be a GPS operating in combination with the plurality of sensors 110 for more precise positioning. The control circuit 505 is communicably coupled to the positioning system 515 to continuously or periodically track the location of the system 100. The control system 500 can be configured to wired and/or wirelessly receive signals through a communicably coupled receiver/transmitter 530. Wireless communication can be any suitable form of wireless communication including radio communication, a cellular network, or satellite-based communication.

Figure 6:
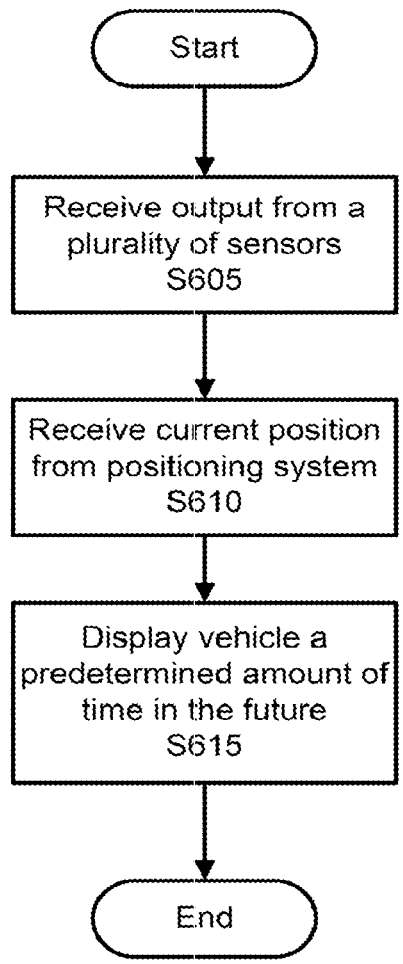
FIG. 6 is a flow chart of a method for displaying an autonomous vehicle a predetermined amount of time in the future.

FIG. 6 depicts an exemplary flow chart of a method for displaying a vehicle at a predetermined amount of time in the future.

In S605, output can be received from the plurality of sensors 110. The output can be indicative of the environment of the autonomous vehicle include other cars, objects, road topology, any upcoming situations that may require one or more vehicle maneuvers, and the like.

In S610, a current position can be received via the positioning system 515. The current position can be advantageous in determining navigational information (e.g., current speed limit, approaching turn in the road, when to begin exiting on an exit ramp, etc.).

In S615, the virtual reality autonomous vehicle 405 can be displayed on one or more of the virtual reality display 140 and the virtual reality interface 150 utilizing the output from the plurality of sensors 110 in S605 and the current position from the positioning system 515 in S610. After the virtual reality autonomous vehicle 405 is displayed, the process can end. However, the process may be continuous in that the vehicle is being displayed consistently at the predetermined amount of time in the future, therefore the sensor output and current position can be received continuously such that the position of the virtual reality autonomous vehicle is updated continuously as if a video of the vehicle driving at the predetermined amount of time in the future is being displayed.

Figure 7:
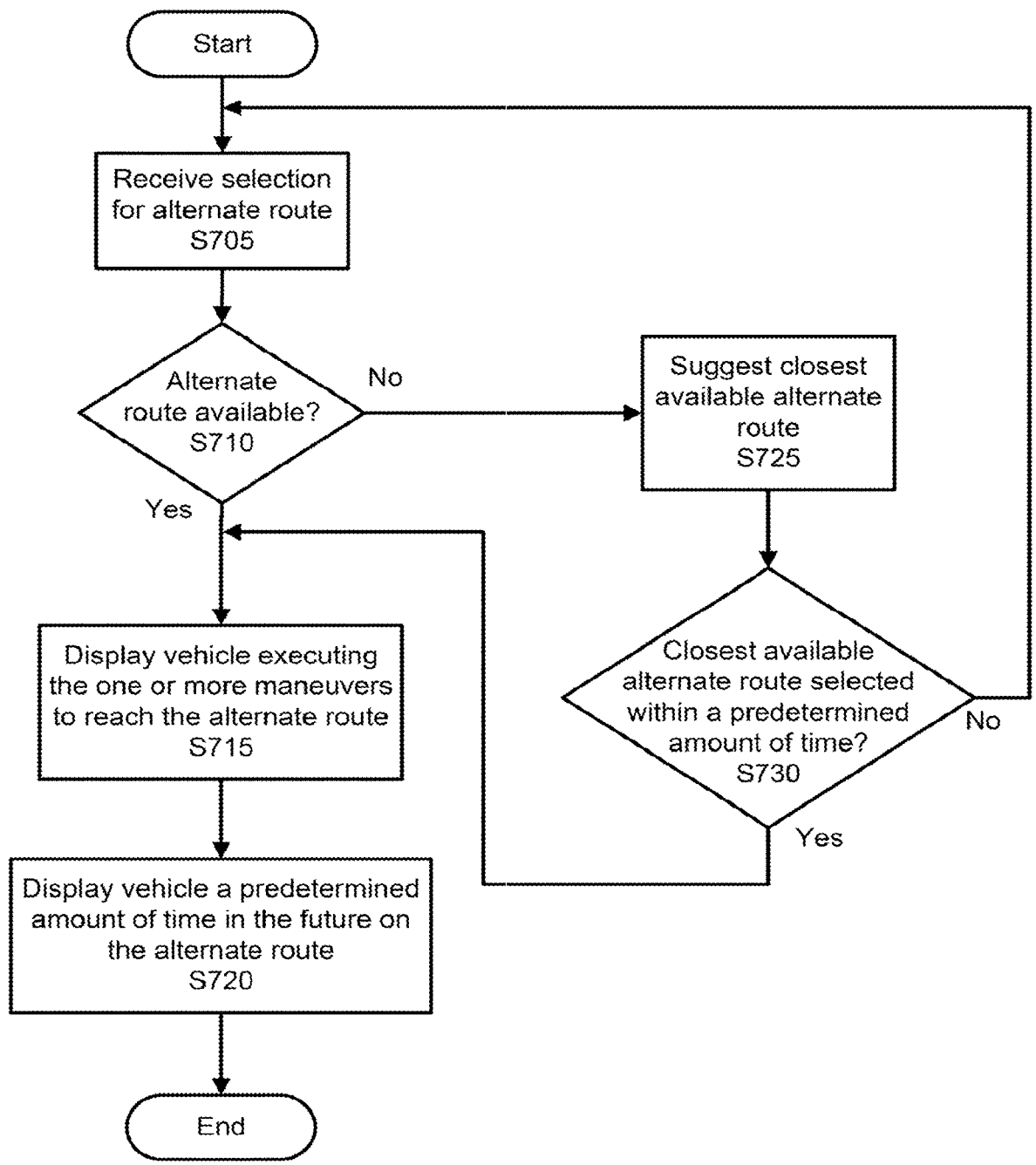
FIG. 7 is a flow chart of a method for adjusting the route of the autonomous vehicle.

FIG. 7 depicts an exemplary flow chart of a method for displaying a vehicle executing an alternate route selected by the operator.

In S705, a selection for an alternate route can be received. For example, the selection for the alternate route may be indicated via interaction 410.

In S710, it can be determined if the alternate route as selected is available. The route may not be available for various reasons including unsafe road conditions, insufficient amount of time to execute the maneuver, invalid selection (e.g., interaction 410 is not on the road), and the like. If the alternate route as selected by interaction 410 is available then the vehicle can be displayed executing the one or more maneuvers to reach the position selected from interaction 410 indicative of the alternate route in S715. However, if the alternate route as selected by interaction 410 is not available, then the system 100 can suggest a closest available alternate route in S725.

In S725, the system 100 can automatically suggest the closest available alternate route when the route intended by the operator in interaction 410 is not available.

In S730, it can be determined if the closest available alternate route suggested in S725 is selected within a predetermined amount of selection time. For example, if the automatically suggested route is not selected within the predetermined amount of selection time then the autonomous vehicle may not have enough time to execute the maneuver. If the automatically suggested closest available alternate route is not selected within the predetermined amount of selection time, then the process can return to S705 to receive a selection for an alternate route as the system 100 can determine that after the predetermine amount of selection time, the automatically suggested available alternate route is no longer available. However, if the automatically suggested closest available alternate route is selected within the predetermined amount of selection time (via confirmation button 435, for example), then the vehicle can be displayed executing the one or more vehicle maneuvers to reach the alternate route in S715.

In S715, the vehicle can be displayed (via one or more of the virtual reality display 140 and the virtual reality interface 150) executing the one or more vehicle maneuvers to reach the alternate if the alternate route was available in S710, or the automatically suggested available alternate in S725 if selected within the predetermined amount of selection time.

In S720, after the vehicle has been displayed reaching the position on the alternate route as selected by the interaction 410, the vehicle can be displayed at the predetermined amount of time in the future on the alternate route. After the vehicle is displayed at the predetermined amount of time in the future, the process can end.

System 100 has several advantages including improving the operator's confidence in the autonomous vehicle. Being able to see the vehicle at the predetermined amount of time in the future can reduce the operator's stress in not being in control of the vehicle. For example, the operator may be able to look ahead on the road and see several brake lights. Had the operator been in control of the vehicle, the operator would be preparing to apply the brakes in reaction to the situation. However, the operator now only needs to look at one or more of the virtual reality display 140 and the virtual reality interface 150 to see that virtual reality autonomous vehicle 405, being 10 seconds in the future, for example, is displayed decelerating, already reacting to the other vehicles in the autonomous vehicle's environment before the operator could have made the same decision manually. Therefore, the operator can be confident in the performance of the autonomous vehicle and at ease while being in the autonomous vehicle.

Additionally, the ability to alter the route of the autonomous vehicle via interaction 410 adds customization to the autonomous vehicle experience. The operator may still be in control of the path of the autonomous vehicle while not manually driving the vehicle. For example, the operator may wish to change lanes, get around other vehicles in the environment, prevent the autonomous vehicle from exiting a main road should the operator wish to stay on the main road (perhaps based on the operators experience, another route is faster a certain time of day), and the like. Therefore, the operator can still be in control of the route of the vehicle while feeling confident in the autonomous vehicle's execution of the route adjustment by viewing the one or more maneuvers required to execute the route adjustment via virtual reality.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A device comprising:
   circuitry configured to:
   receive output from a plurality of sensors,
   receive a current position of a vehicle,
   display the vehicle via a display at a first predetermined amount of time in the future based on the output from the plurality of sensors and the current position of the vehicle, receive a selection for a first alternate route,
determine if the first alternate route is available,
display the vehicle executing one or more maneuvers to reach the first alternate route when the first alternate route is available, and
display the vehicle on the first alternate route in a position corresponding to the first predetermined amount of time in the future when the first alternate route is available.

2. The device of claim 1, wherein the circuitry is further configured to
automatically suggest a second alternate route when the first alternate route is not available, the second alternate route being an available alternate route most similar to the first alternate route,
determine if the second alternate route is selected within a second predetermined amount of time,
display the vehicle executing one or more maneuvers to reach the second alternate route when the second alternate route is selected within the predetermined amount of time, and
display the vehicle on the second alternate route in a position corresponding to the first predetermined amount of time in the future when the second alternate route is selected within the second predetermined amount of time.

3. The device of claim 2, wherein the first predetermined amount of time is indicative of the position of the vehicle that amount of time in the future, the position of the vehicle being a predetermined position based on a planned route of the autonomous vehicle.

4. The device of claim 3, wherein the first predetermined amount of time can be adjusted via a virtual reality interface.

5. The device of claim 1, wherein the display displays a 2D animation of the vehicle and its surroundings operating at the first predetermined amount of time in the future.

6. The device of claim 1, wherein the display displays a 3D animation of the vehicle and its surroundings operating at the first predetermined amount of time in the future.

7. The device of claim 6, wherein the display is a display system including a Heads Up Display (HUD), a hologram projection system, or a liquid crystal display (LCD).

8. The device of claim 2, wherein the selection for the first alternate route is an interaction via a virtual reality interface.

9. The device of claim 2, wherein the automatic suggestion for the second alternate route is displayed on a virtual reality interface.

10. The device of claim 9, wherein the second alternate route is confirmed within the second predetermined amount of time via an interaction with the virtual reality interface.

11. The device of claim 9, wherein the second alternate route is automatically suggested when the autonomous vehicle is not able to safely execute one or more maneuvers to reach the first alternate route.

12. The device of claim 2, wherein the circuitry is configured to not execute a maneuver to any alternate route when the second alternate route is not selected within the predetermined amount of time.

13. The device of claim 2, wherein the one or more maneuvers executed by the vehicle to reach any alternate route are displayed as an animation on the display.

14. The device of claim 2, wherein the one or more maneuvers executed by the vehicle to reach any alternate route are displayed as an animation on a virtual reality interface.

15. The device of claim 2, wherein the one or more maneuvers executed by the vehicle to reach any alternate route are displayed as an animation on the display and a virtual reality interface.

16. The device of claim 15, wherein the one or more maneuvers executed by the vehicle to reach any alternate route are displayed up until the first predetermined amount of time in the future.

17. A method comprising:
receiving output from a plurality of sensors;
receiving a current position of a vehicle;
displaying the vehicle via a display at a first predetermined amount of time in the future based on the output from the plurality of sensors and the current position of the vehicle;
receiving a selection for a first alternate route;
determining, via processing circuitry, if the first alternate route is available;
displaying the vehicle executing one or more maneuvers to reach the first alternate route when the first alternate route is available; and
displaying the vehicle on the first alternate route in a position corresponding to the first predetermined amount of time in the future when the first alternate route is available.

18. The method of claim 17, further comprising:
automatically suggesting a second alternate route when the first alternate route is not available, the second alternate route being an available alternate route most similar to the first alternate route;
determining, via processing circuitry, if the second alternate route is selected within a second predetermined amount of time;
displaying the vehicle executing one or more maneuvers to reach the second alternate route when the second alternate route is selected within the predetermined amount of time; and
displaying the vehicle on the second alternate route in a position corresponding to the first predetermined amount of time in the future when the second alternate route is selected within the second predetermined amount of time.

19. A non-transitory computer-readable storage medium storing computer-readable instructions that, when executed by a computer, cause the computer to perform the method of:
receiving output from a plurality of sensors;
receiving a current position of a vehicle;
displaying the vehicle via a display at a first predetermined amount of time in the future based on the output from the plurality of sensors and the current position of the vehicle;
receiving a selection for a first alternate route;
determining if the first alternate route is available;
displaying the vehicle executing one or more maneuvers to reach the first alternate route when the first alternate route is available; and
displaying the vehicle on the first alternate route in a position corresponding to the first predetermined amount of time in the future when the first alternate route is available.

20. The method of claim 19, further comprising:
automatically suggesting a second alternate route when the first alternate route is not available, the second alternate route being an available alternate route most similar to the first alternate route;
determining if the second alternate route is selected within a second predetermined amount of time, displaying the vehicle executing one or more maneuvers to reach the second alternate route when the second alternate route is selected within the predetermined amount of time; and displaying the vehicle on the second alternate route in a position corresponding to the first predetermined amount of time in the future when the second alternate route is selected within the second predetermined amount of time.

* * * * *